(12) United States Patent
Zhang et al.

(10) Patent No.: US 10,323,993 B2
(45) Date of Patent: Jun. 18, 2019

(54) OPTICAL RESONANCE DEVICE, FORCE MEASURING DEVICE AND METHOD, MODULUS MEASURING METHOD AND DISPLAY PANEL

(71) Applicants: Boe Technology Group Co., Ltd., Beijing (CN); Ordos Yuansheng Optoelectronics Co., Ltd., Inner Mongolia (CN)

(72) Inventors: Xiaojin Zhang, Beijing (CN); Chengsheng Yu, Beijing (CN); Dini Xie, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 0 days.

(21) Appl. No.: 15/737,254

(22) PCT Filed: May 25, 2017

(86) PCT No.: PCT/CN2017/085842
§ 371 (c)(1),
(2) Date: Dec. 15, 2017

(87) PCT Pub. No.: WO2017/215426
PCT Pub. Date: Dec. 21, 2017

(65) Prior Publication Data
US 2018/0372565 A1 Dec. 27, 2018

(30) Foreign Application Priority Data
Jun. 12, 2016 (CN) .......................... 2016 1 0407392

(51) Int. Cl.
*G01L 1/24* (2006.01)
*G06F 3/041* (2006.01)

(52) U.S. Cl.
CPC ................ *G01L 1/241* (2013.01); *G01L 1/24* (2013.01); *G01L 1/247* (2013.01); *G06F 3/041* (2013.01); *G06F 2203/04105* (2013.01)

(58) Field of Classification Search
CPC . G01L 1/24; G01L 1/241; G01L 1/247; G06F 3/041
See application file for complete search history.

(56) References Cited

U.S. PATENT DOCUMENTS 6,487,913 B2 * 12/2002 Debesis .................... G01L 1/24
  73/800
7,355,720 B1 4/2008 Carr
(Continued)

FOREIGN PATENT DOCUMENTS

CN 1103130 C 3/2003
CN 101375144 A 2/2009
(Continued)

OTHER PUBLICATIONS

Boe Technology Group Co., Ltd., et al. "Search Report" for Chinese PCT Application No. PCT/CN2017/085842, dated Sep. 5, 2017.
(Continued)

*Primary Examiner* — Jonathan M Dunlap
(74) *Attorney, Agent, or Firm* — Womble Bond Dickinson (US) LLP

(57) ABSTRACT

Embodiments of this disclosure provide an optical resonance device, a force measuring device and method, a modulus measuring method and a display panel. The optical resonance device includes: a light emitting layer, a reflecting layer, and a transflective layer. The light emitting layer is configured to generate light. The reflecting layer is arranged
(Continued)

at one side of the light emitting layer and is configured to reflect the light generated by the light emitting layer. The transflective layer is arranged at the other side of the light emitting layer and is configured to transmit a portion of the light generated by the light emitting layer and reflect a portion of the light generated by the light emitting layer. The force measuring device includes: an optical resonance device, at least one optical sensor, a bearing unit and a calculation unit.

16 Claims, 7 Drawing Sheets

(56) References Cited

U.S. PATENT DOCUMENTS

| | | | | |
|---|---|---|---|---|
| 8,331,741 | B2* | 12/2012 | Kilic | G01H 9/004 |
| | | | | 356/480 |
| 8,810,780 | B1* | 8/2014 | Barcelo | G01L 1/241 |
| | | | | 356/32 |
| 9,157,856 | B2* | 10/2015 | Guo | G01N 21/59 |
| 9,354,366 | B2* | 5/2016 | Jain | H01S 5/005 |
| 9,880,096 | B2* | 1/2018 | Bond | H01S 5/10 |
| 10,067,398 | B2* | 9/2018 | O'Keeffe | G02F 1/167 |
| 2002/0104381 | A1* | 8/2002 | Debesis | G01L 1/24 |
| | | | | 73/800 |
| 2004/0160172 | A1 | 8/2004 | Tyan et al. | |
| 2007/0280581 | A1 | 12/2007 | Wipiejewski | |
| 2009/0085478 | A1 | 4/2009 | Cok et al. | |
| 2010/0296103 | A1 | 11/2010 | Smith et al. | |
| 2012/0160031 | A1 | 6/2012 | Van et al. | |
| 2012/0186353 | A1* | 7/2012 | Kilic | G01H 9/00 |
| | | | | 73/657 |
| 2013/0001556 | A1 | 1/2013 | Hu et al. | |
| 2013/0319135 | A1 | 12/2013 | Okada et al. | |
| 2014/0055845 | A1* | 2/2014 | Jain | H01S 5/005 |
| | | | | 359/344 |
| 2014/0070082 | A1* | 3/2014 | Guo | G01N 21/59 |
| | | | | 250/227.14 |
| 2014/0211195 | A1* | 7/2014 | Barcelo | G01B 11/16 |
| | | | | 356/33 |
| 2014/0225102 | A1 | 8/2014 | Ikeda et al. | |
| 2015/0192714 | A1* | 7/2015 | Jain | H01S 5/005 |
| | | | | 438/31 |
| 2016/0026061 | A1* | 1/2016 | O'Keeffe | G02F 1/167 |
| | | | | 359/296 |
| 2016/0033397 | A1* | 2/2016 | Bond | H01S 5/10 |
| | | | | 356/437 |
| 2017/0168204 | A1 | 6/2017 | Zhang | |

FOREIGN PATENT DOCUMENTS

| | | |
|---|---|---|
| CN | 101821872 | 9/2010 |
| CN | 101910898 | 12/2010 |
| CN | 101957246 | 1/2011 |
| CN | 102004010 | 4/2011 |
| CN | 102435348 | 5/2012 |
| CN | 202522351 | 11/2012 |
| CN | 102856395 | 1/2013 |
| CN | 103430000 | 12/2013 |
| CN | 103697954 | 4/2014 |
| CN | 103985732 A | 8/2014 |
| CN | 204423339 | 6/2015 |
| CN | 204506009 | 7/2015 |
| CN | 104865732 A | 8/2015 |
| CN | 105098094 | 11/2015 |
| CN | 106124096 | 11/2016 |
| JP | 4521533 | 8/2010 |
| TW | 200417275 | 9/2004 |

OTHER PUBLICATIONS

Written Opinion received for PCT Patent Application No. PCT/CN2017/085842, dated Sep. 5, 2017, 4 pages of Original Document Only.

Office Action received for Chinese Patent Application No. 201610407392.2, dated Jun. 22, 2018, 17 pages (9 pages of English Translation and 8 pages of Office Action).

* cited by examiner

OPTICAL RESONANCE DEVICE, FORCE MEASURING DEVICE AND METHOD, MODULUS MEASURING METHOD AND DISPLAY PANEL

CROSS REFERENCE OF RELATED APPLICATION

The present application is the U.S. national phase entry of the international application PCT/CN2017/085842, with an international filing date of May 25, 2017, which claims the benefit of Chinese Patent Application No. 201610407392.2, filed on Jun. 12, 2016, the entire disclosures of which are incorporated herein by reference.

TECHNICAL FIELD

Embodiments of this disclosure relate to the field of force measuring technology, particularly to an optical resonance device, a force measuring device and method, a modulus measuring method and a display panel.

BACKGROUND

In the field of force measurement, particularly in micro force measurement, linkage type measurement (including e.g., mechanical linkage type, electronic linkage type and optical fiber linkage type) is mainly used. The mechanical linkage type measuring device includes for example a spring balance which measures a force to be measured based on a displacement amount of a mechanical component under the action of the force to be measured. The electronic linkage type measuring device includes for example a high-accuracy electronic balance which measures a force to be measured based on a change amount of the characteristic value of an electronic element under the action of the force to be measured. In the optical fiber linkage type measuring device, the force to be measured acts on the optical fiber to change the propagation path of the light, so as to enable the action of the force to be measured to be converted into change of the characteristic of the light, which can amplify the effect of the action of the force to be measured.

In the mechanical linkage type measuring device, contact damping between the mechanical components cannot be avoided, and extra system error is caused inevitably. In the electronic linkage type measuring device, the error caused by influence of external factors such as electromagnetic environment, humidity and temperature on the measurement cannot be eliminated fundamentally. The optical fiber sensing linkage type force measuring device has better anti-interference ability and measurement accuracy, however, the optical design requires a relatively high accuracy, moreover, the design and manufacturing process are complex and have high cost.

SUMMARY

Embodiments of this disclosure provide an optical resonance device, a force measuring device and method, a modulus measuring method and a display panel.

According to a first aspect, an embodiment of this disclosure provides an optical resonance device. The optical resonance device includes: a light emitting layer, a reflecting layer, and a transflective layer. The light emitting layer is configured to generate light. The reflecting layer is arranged at one side of the light emitting layer and is configured to reflect the light generated by the light emitting layer. The transflective layer is arranged at the other side of the light emitting layer and is configured to transmit a portion of the light generated by the light emitting layer and reflect a portion of the light generated by the light emitting layer.

In an embodiment of this disclosure, the optical resonance device further includes a transparent dielectric layer arranged between the light emitting layer and the transflective layer.

In an embodiment of this disclosure, the transparent dielectric layer is made from optical adhesive.

In an embodiment of this disclosure, the transparent dielectric layer is configured to generate deformation in response to an action of force to the optical resonance device.

In an embodiment of this disclosure, the light emitting layer includes a photoluminescence layer configured to generate light under excitation of exciting light. The reflecting layer includes a photon crystal layer configured to reflect the light generated by the photoluminescence layer and transmit the exciting light.

In an embodiment of this disclosure, the photon crystal layer includes at least one unit layer. The unit layer includes a first sub-reflecting layer and a second sub-reflecting layer laminated together.

In an embodiment of this disclosure, the first sub-reflecting layer is made from $Ta_2O_5$, and the second sub-reflecting layer is made from $MgF_2$.

In an embodiment of this disclosure, a sum of thickness of the first sub-reflecting layer and thickness of the second sub-reflecting layer is greater than or equal to 100 nm, less than or equal to 200 nm. A ratio of the thickness of the first sub-reflecting layer and the thickness of the second sub-reflecting layer is greater than or equal to 0.25, less than or equal to 4. The amount of the first sub-reflecting layers is equal to the amount of the second sub-reflecting layers, which is greater than or equal to 7, less than or equal to 15.

In an embodiment of this disclosure, the light emitting layer includes an electroluminescent layer configured to generate light under excitation of an exciting electric field.

According to a second aspect, an embodiment of this disclosure provides a force measuring device. The force measuring device includes: the above optical resonance device, at least one optical sensor, a bearing unit, and a calculation unit. The optical resonance device is configured to emit light. The at least one optical sensor is configured to detect the light emitted from the optical resonance device. The bearing unit is connected with the optical resonance device and is configured to receive an action of force and transfer the force to the optical resonance device. The calculation unit is connected with the optical sensor and is configured to calculate the force based on a characteristic of the light detected by the optical sensor.

In an embodiment of this disclosure, the at least one optical sensor is arranged in the transflective layer and is configured to detect light transmitted from the transflective layer.

In an embodiment of this disclosure, the at least one optical sensor is arranged in a circle surrounding the bearing unit.

In an embodiment of this disclosure, the optical resonance device further includes an elastic transparent dielectric layer arranged between the light emitting layer and the transflective layer.

In an embodiment of this disclosure, the transparent dielectric layer is configured to generate deformation in response to an action of force to the optical resonance device.

In an embodiment of this disclosure, the light emitting layer includes a photoluminescence layer configured to generate light under excitation of exciting light. The reflecting layer includes a photon crystal layer configured to reflect the light generated by the photoluminescence layer and transmit the exciting light. The force measuring device further includes an excitation light source configured to provide the exciting light.

In an embodiment of this disclosure, the light emitting layer includes an electroluminescent layer configured to generate light under excitation of an exciting electric field. The force measuring device further includes an excitation power supply configured to provide electric energy so as to generate the exciting electric field.

According to a third aspect, an embodiment of this disclosure provides a force measuring method using the above force measuring device. The method includes: detecting light emitted from the optical resonance device by the at least one optical sensor, obtaining a first peak position based on the detected light, and obtaining a first length of a resonant cavity of the optical resonance device corresponding to the first peak position; receiving an action of force by the bearing unit; detecting light emitted from the optical resonance device by the at least one optical sensor, obtaining a second peak position based on the detected light, and obtaining a second length of the resonant cavity of the optical resonance device corresponding to the second peak position; and calculating the force based on a difference value between the first length and the second length, and a coefficient between a length change amount of the resonant cavity of the optical resonance device and a force.

In an embodiment of this disclosure, the force measuring device further includes a transparent dielectric layer arranged between the light emitting layer and the transflective layer. The transparent dielectric layer is configured to generate deformation in response to an action of force to the optical resonance device.

In an embodiment of this disclosure, a formula $F'=\bar{k}\Delta$ is used for calculating the force, wherein F' is the force, $\bar{k}$ is the coefficient between the length change amount of the resonant cavity of the optical resonance device and the force, which is a constant value, and $\Delta$ is the difference value between the first length and the second length.

In an embodiment of this disclosure, it further includes a calibration phase. The calibration phase includes: detecting light emitted from the optical resonance device by the at least one optical sensor, obtaining a third peak position based on the detected light, and obtaining a third length of the resonant cavity of the optical resonance device corresponding to the third peak position; receiving an action of a predetermined constant force by the bearing unit; detecting light emitted from the optical resonance device by the at least one optical sensor, obtaining a fourth peak position based on the detected light, and obtaining a fourth length of the resonant cavity of the optical resonance device corresponding to the fourth peak position; and calculating a coefficient between a length change amount of the resonant cavity of the optical resonance device and a force based on a difference value between the third length and the fourth length, as well as the predetermined constant force.

In an embodiment of this disclosure, a formula $\bar{k}=\Delta/F$ is used for calculating the coefficient, wherein $\bar{k}$ is the coefficient between the length change amount of the resonant cavity of the optical resonance device and the force, F is the predetermined constant force, and $\Delta$ is the difference value between the third length and the fourth length.

According to a fourth aspect, an embodiment of this disclosure provides a modulus measuring method using the above force measuring device to measure a modulus of the transparent dielectric. The force measuring device further includes a transparent dielectric layer formed by the transparent dielectric arranged between the light emitting layer and the transflective layer. The method includes: detecting light emitted from the optical resonance device by the at least one optical sensor, obtaining a fifth peak position based on the detected light, and obtaining a fifth length of the resonant cavity of the optical resonance device corresponding to the fifth peak position; receiving an action of a predetermined constant force by the bearing unit; detecting light emitted from the optical resonance device by the at least one optical sensor, obtaining a sixth peak position based on the detected light, and obtaining a sixth length of the resonant cavity of the optical resonance device corresponding to the sixth peak position; and calculating a modulus of the transparent dielectric layer based on a difference value between the fifth length and the sixth length, as well as the predetermined constant force.

In an embodiment of this disclosure, the transparent dielectric layer is configured to generate deformation in response to an action of force to the optical resonance device.

In an embodiment of this disclosure, a formula $\bar{k}=\Delta/F$ is used for calculating the modulus, wherein $\bar{k}$ is the modulus, F is the predetermined constant force, and $\Delta$ is the difference value between the fifth length and the sixth length.

According to a fifth aspect, an embodiment of this disclosure provides a display panel including the above force measuring device.

According to the embodiments of this disclosure, an optical resonance device, a force measuring device and a display panel have simple structures and are easy for batch production. A force measuring method and a modulus measuring method that are also provided, which are easy to carry out.

BRIEF DESCRIPTION OF THE DRAWINGS

In order to explain the technical solutions of embodiments of this disclosure more clearly, next, the drawings of the embodiments will be explained briefly. It should be aware that the drawings described below only relate to some embodiments of this disclosure, rather than limitations to this disclosure, in which.

DETAILED DESCRIPTION OF EMBODIMENTS

In order to enable the technical solutions and advantages of the embodiments of this disclosure to be clearer, next, the technical solutions of the embodiments of this disclosure will be described clearly and completely in conjunction with the drawings. Apparently, the described embodiments are only a part of rather than all of the embodiments of this disclosure. Based on the described embodiments of this disclosure, all other embodiments obtained by the skilled person in the art on the premise of not paying any inventive effort also belong to the protection scope of this disclosure.

Figure 1:
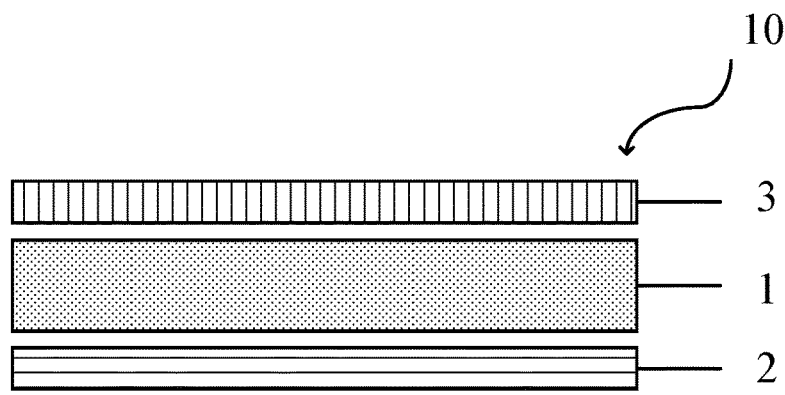
FIG. 1 is a structural schematic diagram of an optical resonance device according to a first embodiment of this disclosure.

FIG. 1 is a structural schematic diagram of an optical resonance device according to a first embodiment of this disclosure. An embodiment of this disclosure provides an optical resonance device 10. The optical resonance device 10 includes: a light emitting layer 1, a reflecting layer 2, and a transflective layer 3. The light emitting layer 1 is configured to generate light. The reflecting layer 2 is arranged at one side of the light emitting layer 1 and is configured to reflect the light generated by the light emitting layer 1. The transflective layer 3 is arranged at the other side of the light emitting layer 1 so as to be opposite to the reflecting layer 2, and is configured to transmit a portion of the light generated by the light emitting layer 1 and reflect the light generated by the light emitting layer 1.

The light emitting layer 1, the reflecting layer 2 and the transflective layer 3 can adjoin each other, and can also have gaps or other structures between them, thus the length of the optical resonance device 10 can be adjusted.

In an embodiment of this disclosure, an optical resonance device of a layered structure is provided, which has a simple structure and easy for batch production. Using the light emitting layer to generate resonance light is benefit for reducing stray light and improving efficiency.

Figure 2:
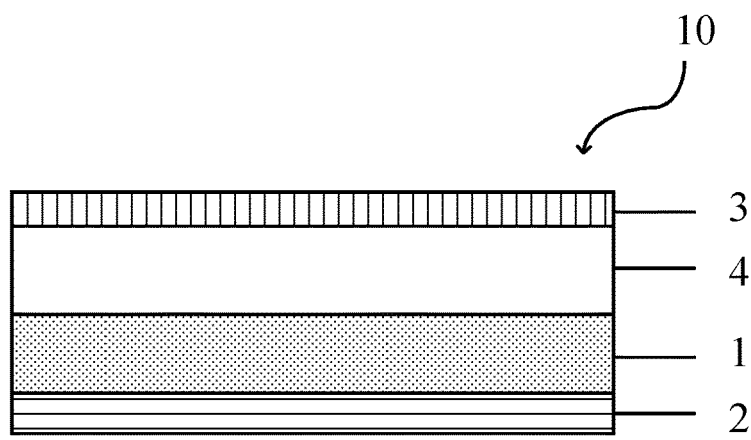
FIG. 2 is another structural schematic diagram of the optical resonance device according to the first embodiment of this disclosure.

FIG. 2 is another structural schematic diagram of the optical resonance device according to the first embodiment of this disclosure. According to an embodiment of this disclosure, the optical resonance device 10 can further include a transparent dielectric layer 4 arranged between the light emitting layer 1 and the transflective layer 3.

According to an embodiment of this disclosure, the transparent dielectric layer 4 can be elastic and configured to generate deformation in response to an action of force to the optical resonance device 10. The transparent dielectric layer 4 can have limited elastic deformation in the propagation direction of light. The transparent dielectric layer 4 can support the optical resonance device 10, adjust the length of the optical resonance device 10, and generate deformation when a force is applied to the optical resonance device 10, which can protect the optical resonance device 10. If the transparent dielectric layer 4 has a transmissivity of more than 80% to the transmitted light and has no photoluminescence characteristics, it can be effectively applied to the optical resonance device 10 without generating extra influence to light propagation.

According to an embodiment of this disclosure, the transparent dielectric layer 4 can be made from optical adhesive. The optical adhesive can connect the light emitting layer 1 and the transflective layer 3, and can fix the structure of the optical resonance device 10.

Figure 3:
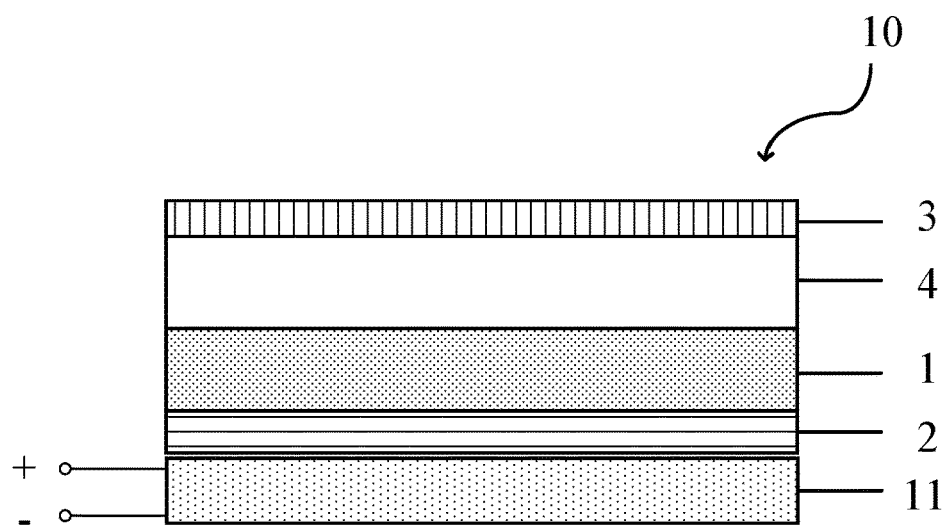
FIG. 3 is a structural schematic diagram of the optical resonance device in FIG. 2 including a photoluminescence layer.

FIG. 3 is a structural schematic diagram of the optical resonance device in FIG. 2 including a photoluminescence layer. As shown in FIG. 3, the light emitting layer 1 includes a photoluminescence layer configured to generate light under excitation of exciting light. The reflecting layer 2 includes a photon crystal layer configured to reflect the light generated by the photoluminescence layer and transmit the exciting light.

The photoluminescence layer generates light after being excited by the exciting light. The wavelength of the generated light is generally longer than the exciting light. For example, when the exciting light is blue light, the generated light can be green light or red light.

The photoluminescence layer can be selected from various efficient light emitting types, including: organic light emitting doping type, for example, polyvinyl carbazole and tris-(8-hydroxyquinoline) aluminum (PVK:Alq3) type, soluble polyparaphenylenevinylene (MEH-PPV) type etc.; quantum dot light emitting type, for example GaAs quantum dot type etc. The emission spectrum of the photoluminescence layer can be a single peak structure. The photoluminescence layer can be manufactured using coating, evaporating etc., and the thickness can be 20-100 nm.

A propagation path of light is formed between the transflective layer 3 and the reflecting layer 2, both of them apply effect of micro-cavity interference to the light emitted from the photoluminescence layer 1. The transflective layer 3 can be formed by depositing a metal material on the surface of a hard substrate (such as glass, quartz etc.) that is transparent for visible light through magnetron sputtering or evaporating. The transmissivity of the transflective layer 3 can be in a range of 30%~50%.

The optical resonance device according to an embodiment of this disclosure uses the photoluminescence layer to generate resonance light, which can reduce stray light and improve efficiency. Using the photon crystal layer as a reflecting surface increases the reflectivity of the resonance light in the optical resonance device and can transmit exciting light for the photoluminescence layer.

The excitation light source 11 shown in FIG. 3 can include various light sources, e.g., LED or OLED light sources. Using the light source with a layered structure, e.g. the OLED light source, will be benefit for simplifying the structure and the manufacturing process. In an embodiment of this disclosure, a blue light OLED device, e.g. a blue light OLED device with a peak wavelength of 460 nm, can be selected as the excitation light source 11.

Figure 4:
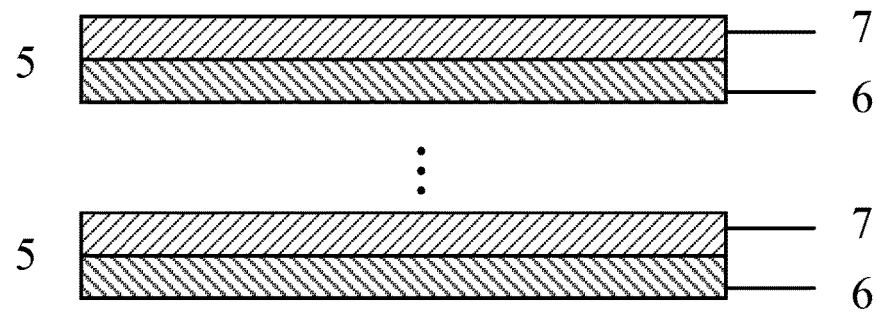
FIG. 4 is a structural schematic diagram of a photon crystal layer in the optical resonance device as shown in FIG. 3.

FIG. 4 is a structural schematic diagram of a photon crystal layer in the optical resonance device as shown in FIG. 3. In an embodiment of this disclosure, the photon crystal layer includes at least one unit layer 5. The unit layer 5 includes a first sub-reflecting layer 6 and a second sub-reflecting layer 7 laminated together.

The first sub-reflecting layer 6 and the second sub-reflecting layer 7 can be made from transparent materials of different refractive indexes, e.g., $SiO_2$, $ZnO$, $Ta_2O_5$, $MgF_2$ etc. In this way, because of the periodic variation of the refractive index of the material in the propagation direction of light, the photon crystal layer will generate an optical forbidden band for the transmitted light. Light with a wavelength within this forbidden band cannot pass through and a strong reflection characteristic is shown, while light outside the forbidden band can pass through successfully. The photon crystal layer can have a bandpass characteristic to light, i.e., transmitting the exciting light for the photoluminescence layer while reflecting other light.

In order to ensure the highest reflectivity, according to the principle of thin film optics, the overall thickness of the photon crystal layer should be a quarter of the central wavelength $\lambda_0$, and $\lambda_0$ meets the following formula:

$$\lambda_0 = 2 \cdot \frac{\lambda_{min}\lambda_{max}}{\lambda_{min} + \lambda_{max}}, d = 2\left(\frac{\lambda_0}{\lambda_{min}} - 1\right);$$

Wherein $\lambda_{min} \sim \lambda_{max}$ is the forbidden band range, $\lambda_{min}$ is the lower limit wavelength of the forbidden band, $\lambda_{max}$ is the upper limit wavelength of the forbidden band, d is the width of the forbidden band.

Under the condition of normal incidence, the thickness a of the first sub-reflecting layer 6 and the thickness b of the second sub-reflecting layer 7 in the photon crystal layer meet the following relational expression:

$$k(w) = \frac{2m\lambda_0}{a+b},$$

wherein $k(w)=2\pi/\lambda_0$, m=1, 2, 3 . . . .

The first sub-reflecting layer 6 and the second sub-reflecting layer 7 can be manufactured by thermal evaporation, electron beam, molecular beam epitaxy, magnetron sputtering, PECVD etc.

For the convenience of manufacturing and meeting the performance requirements on transmission and reflection, as an example, in an embodiment of this disclosure, the refractive index of the material can be selected to be no more than 2.6 and no less than 1.3. For example, the first sub-reflecting layer 6 can be made from $Ta_2O_5$, and the second sub-reflecting layer 7 can be made from $MgF_2$. In a unit layer 5, a sum of the thickness of the first sub-reflecting layer(s) 6 and the thickness of the second sub-reflecting layer(s) 7 can be greater than or equal to 100 nm, less than or equal to 200 nm. The ratio of the thickness of the first sub-reflecting layer 6 and the thickness of the second sub-reflecting layer 7 can be greater than or equal to 0.25, less than or equal to 4. In the whole photon crystal layer, the amount of the first sub-reflecting layers 6 can be equal to the amount of the second sub-reflecting layer 7, and it can be greater than or equal to 7, less than or equal to 15.

Figure 5:
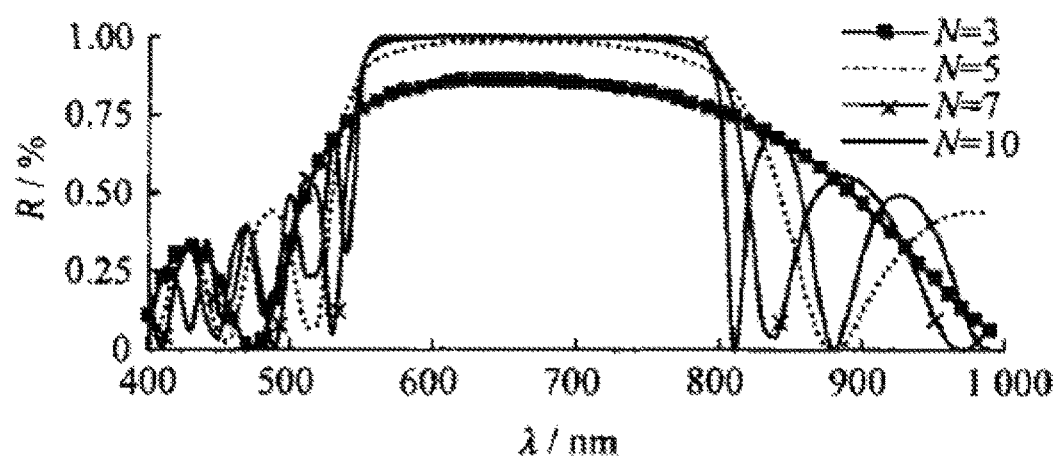
FIG. 5 is a schematic diagram of a reflectivity of the photon crystal layer as shown in FIG. 4 including multiple unit layers.

FIG. 5 is a schematic diagram showing reflectivity of the photon crystal layer as shown in FIG. 4 including multiple unit layers. As shown in FIG. 5, the amount of the unit layers 5 is N, i.e., the amount of the laminated first sub-reflecting layers 6 and second sub-reflecting layers 7 can also influence the reflectivity R. The higher N is, the larger the reflectivity R will be, and the steeper the edge of the curve of the reflectivity R will be. In the figure, λ represents the wavelength of light.

Figure 6:
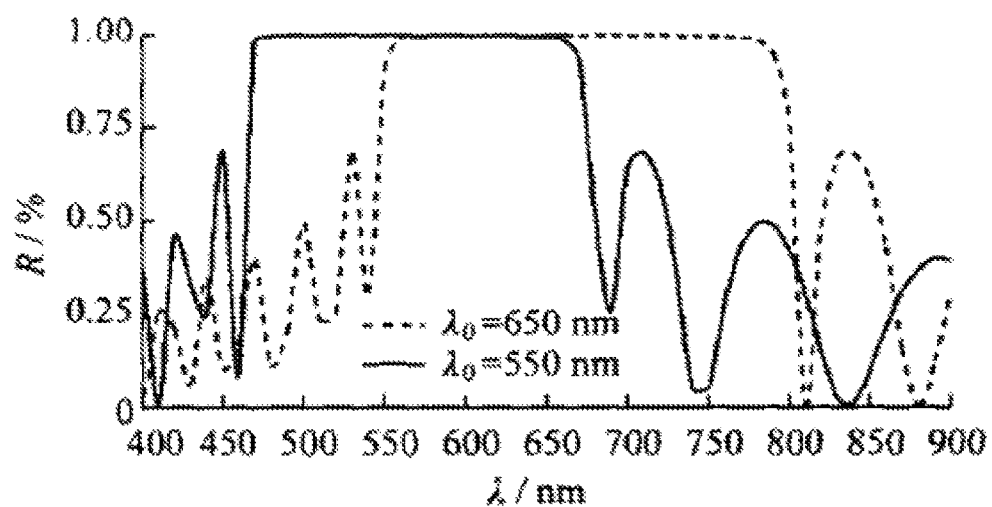
FIG. 6 is a schematic diagram of a reflectivity of the photon crystal layer as shown in FIG. 4 includes different unit layers.

FIG. 6 is a schematic diagram showing reflectivity of the photon crystal layer as shown in FIG. 4 including different unit layers. One kind of unit layers 5, i.e., the stack combination of one kind of first sub-reflecting layers 6 and one kind of second sub-reflecting layers 7 cannot provide sufficient forbidden band width. Here, various unit layers 5 with different central wavelengths can be used to achieve a tunable forbidden band width. Here, the amount of the materials contained in the photon crystal layer can be greater than two.

Figure 7:
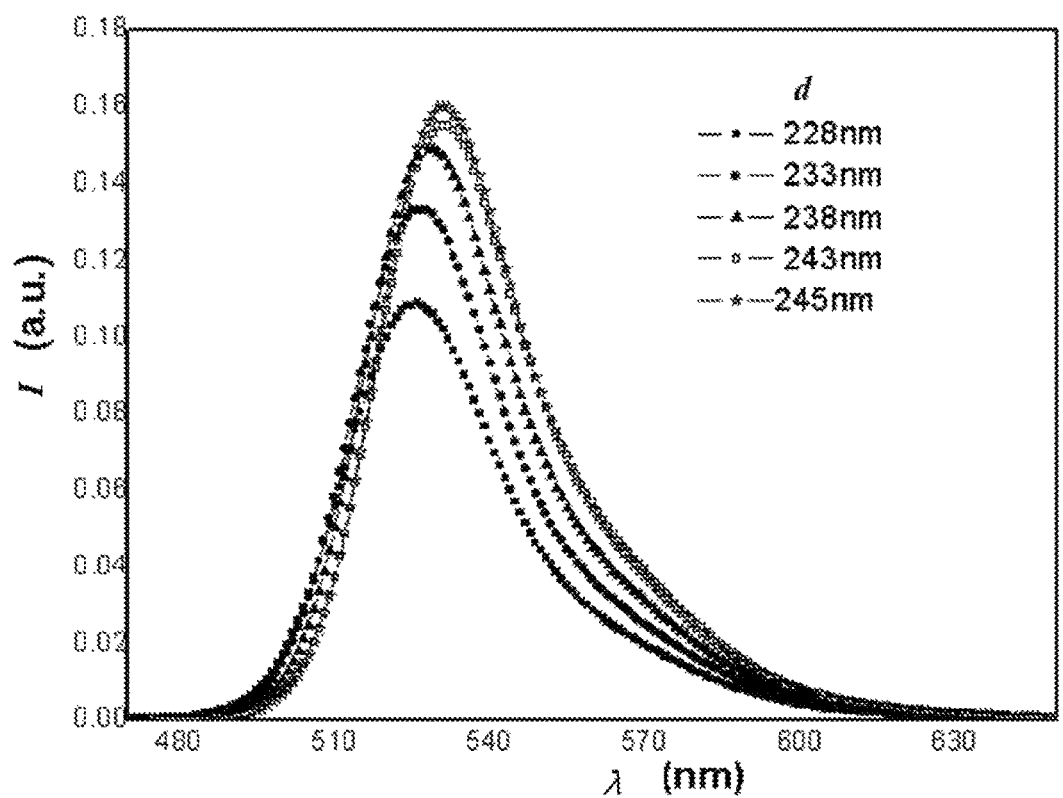
FIG. 7 is a schematic diagram of a relationship between a length of the optical resonance device and a characteristic of light.

FIG. 7 is a schematic diagram of a relationship between the length of the optical resonance device and the characteristic of light. If the exciting light and the structure of the optical resonance device 10 are not changed, the relationship between the length d of the optical resonance device 10 and the characteristic of the transmitted light (e.g., the wavelength λ, intensity I of the transmitted light) is certain. This relationship can make reference to theoretical calculation and determined by actual measurement. As shown in FIG. 7, for a certain length d, there is a corresponding spectral graph, and for different lengths, the spectral graphs are also not the same. Hence, the length of the optical resonance device 10 changed due to the action of the force to be measured can be measured by measuring the characteristic of the transmitted light of the optical resonance device 10, so as to obtain the characteristic of the force to be measured. The length d can be for example: the physical length of the resonant cavity of the optical resonance device 10, i.e., a distance between the reflecting layer 2 and the transflective layer 3, or an optical path length of the resonant cavity calculated based on the refractive index of the dielectric (including: e.g., the light emitting layer 1, the transparent dielectric layer 4) in the resonant cavity, wherein the optical path length can also be obtained from actual measurement.

It should be understood that the specific data as shown in FIG. 7 are only illustration of the relationship between the length of the optical resonance device and the characteristic of the light, rather than specific definition to this relationship.

Figure 8:
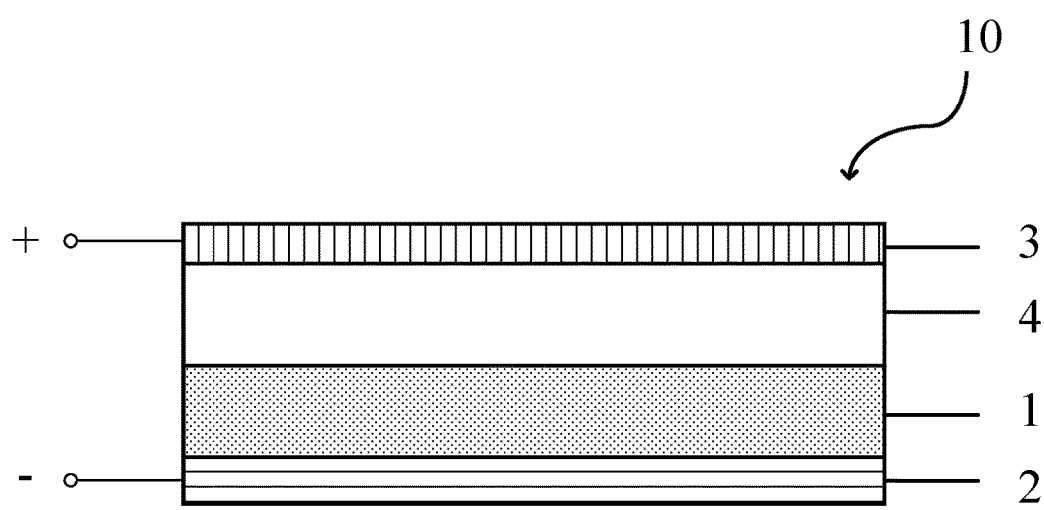
FIG. 8 is a structural schematic diagram of the optical resonance device in FIG. 2 including an electroluminescent layer.

FIG. 8 is a structural schematic diagram of the optical resonance device in FIG. 2 including an electroluminescent layer. The light emitting layer 1 includes an electroluminescent layer configured to generate light under excitation of an exciting electric field. The reflecting layer 2 and the transflective layer 3 can be multiplexed as electrodes, so as to generate the exciting electric field. In addition, a separate electrode layer (not shown in the figure) can also be arranged so as to generate the exciting electric field.

Figure 9:
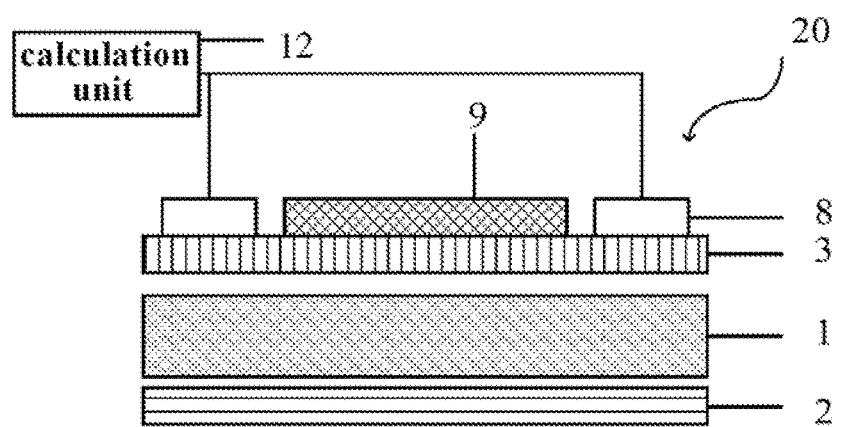
FIG. 9 is a structural schematic diagram of a force measuring device according to a second embodiment of this disclosure.

FIG. 9 is a structural schematic diagram of a force measuring device according to a second embodiment of this disclosure. An embodiment of this disclosure provides a force measuring device 20. The force measuring device 20 includes: the optical resonance device 10 as shown in FIG. 1, at least one optical sensor 8, a bearing unit 9, and a calculation unit 12. The optical resonance device 10 is configured to emit light. The at least one optical sensor 8 is configured to detect the light emitted from the optical resonance device 10. The bearing unit 9 is connected with the optical resonance device 10 and is configured to receive an action of force and transfer the force to the optical resonance device 10. The calculation unit 12 is connected with the optical sensor 8 and is configured to calculate the force based on the light detected by the optical sensor 8.

In an embodiment of this disclosure, the sensitivity of coupling output of the optical resonance device to the variation of the cavity length of the optical resonance device is used to detect minimum displacement variation caused by a tiny force. Moreover, the detection data of a plurality of optical sensors can be combined to further improve the measurement accuracy of the force. The force measuring device can be adapted to various measurement environments and has strong anti-interference ability.

Figure 10:
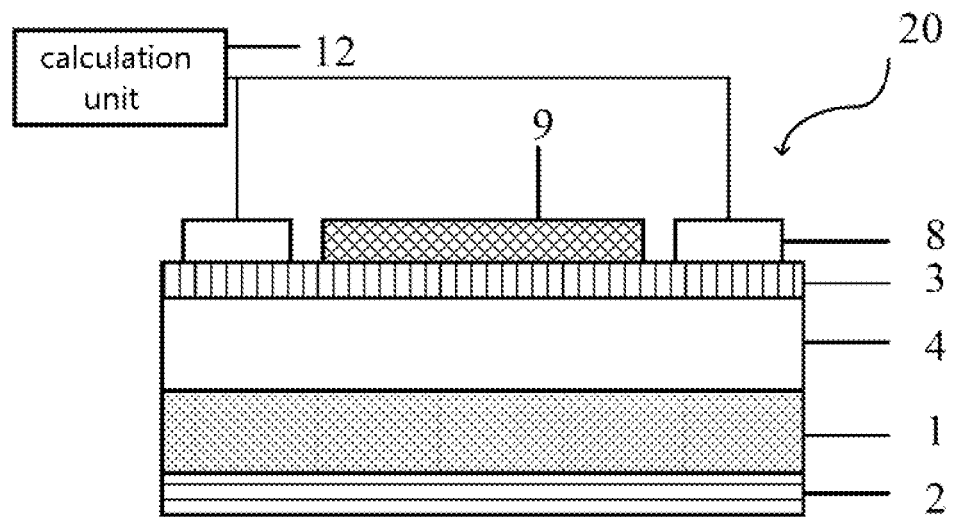
FIG. 10 is another structural schematic diagram of the force measuring device according to the second embodiment of this disclosure.

FIG. 10 is another structural schematic diagram of the force measuring device according to the second embodiment of this disclosure. In an embodiment of this disclosure, the optical resonance device 10 can further include a transparent dielectric layer 4 arranged between the photoluminescence layer 1 and the transflective layer 3.

When the bearing unit 9 receives an action of the force to be measured, the optical resonance device will be deformed (e.g., stretched or shortened) along the force direction, thereby resulting in variation of the length of the optical resonance device 10. If the optical resonance device 10 includes a transparent dielectric layer 4, the transparent dielectric layer 4 is deformed so as to protect other structures in the optical resonance device 10. As described above, the transparent dielectric layer 4 can be made from optical adhesive and can be elastic.

Figure 11:
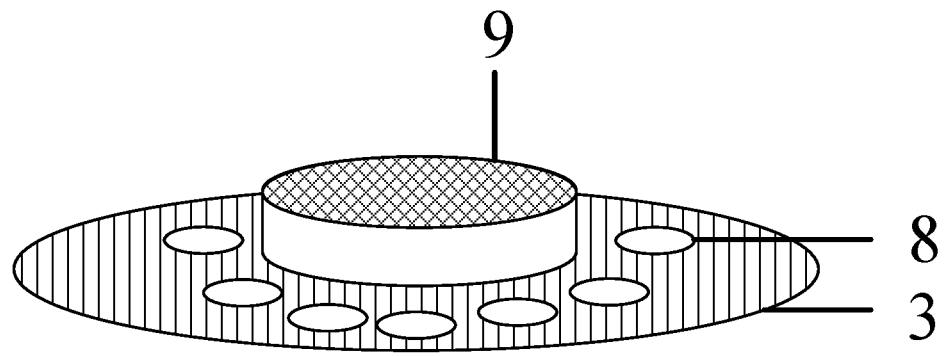
FIG. 11 is a structural schematic diagram of an optical sensor array of the force measuring device as shown in FIG. 9.

FIG. 11 is a structural schematic diagram of an optical sensor array of the force measuring device as shown in FIG. 9. In an embodiment of this disclosure, the at least one optical sensor 8 is arranged in the transflective layer 3 and is configured to detect light transmitted from the transflective layer 3.

In an embodiment of this disclosure, the at least one optical sensor 8 is arranged in a circle surrounding the bearing unit 9, so as to reduce the difference between the detection results of different optical sensors 8, and improve the detection accuracy. The optical sensor 8 sends the information of the detected light to the calculation unit 12. The calculation unit 12 calculates the spectral data of the light. The optical sensor 8 can be a CCD probe.

Figure 12:
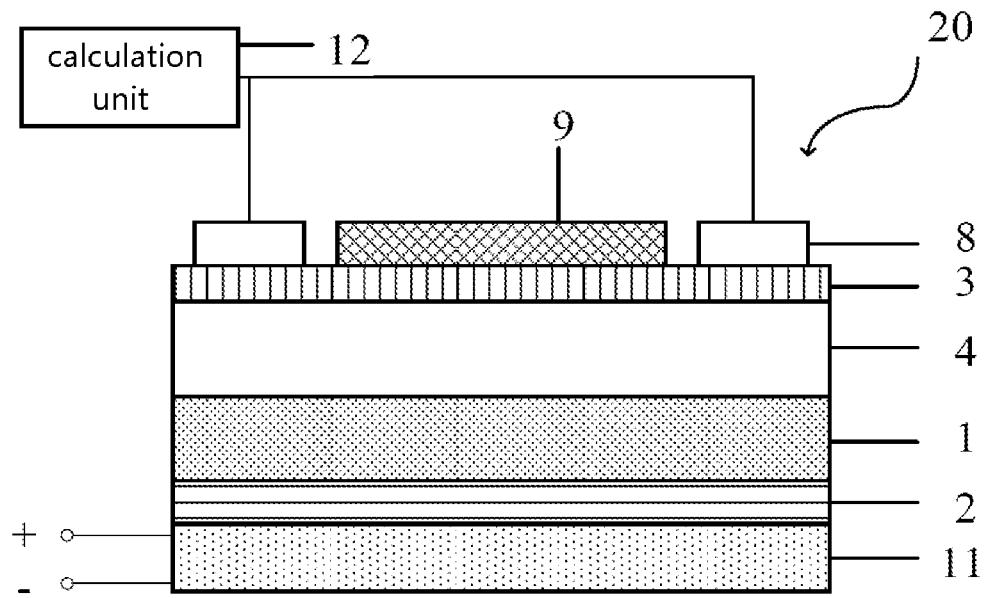
FIG. 12 is a structural schematic diagram of the force measuring device in FIG. 10 including a photoluminescence layer.

FIG. 12 is a structural schematic diagram of the force measuring device in FIG. 10 including a photoluminescence layer. In an embodiment of this disclosure, the optical resonance device 10 can use a photoluminescence layer. Here, the light emitting layer 1 includes a photoluminescence layer configured to generate light under excitation of exciting light. The reflecting layer 2 includes a photon crystal layer configured to reflect the light generated by the photoluminescence layer and transmit the exciting light. The force measuring device 20 further includes an excitation light source 11 configured to provide exciting light for the photoluminescence layer 1.

Figure 13:
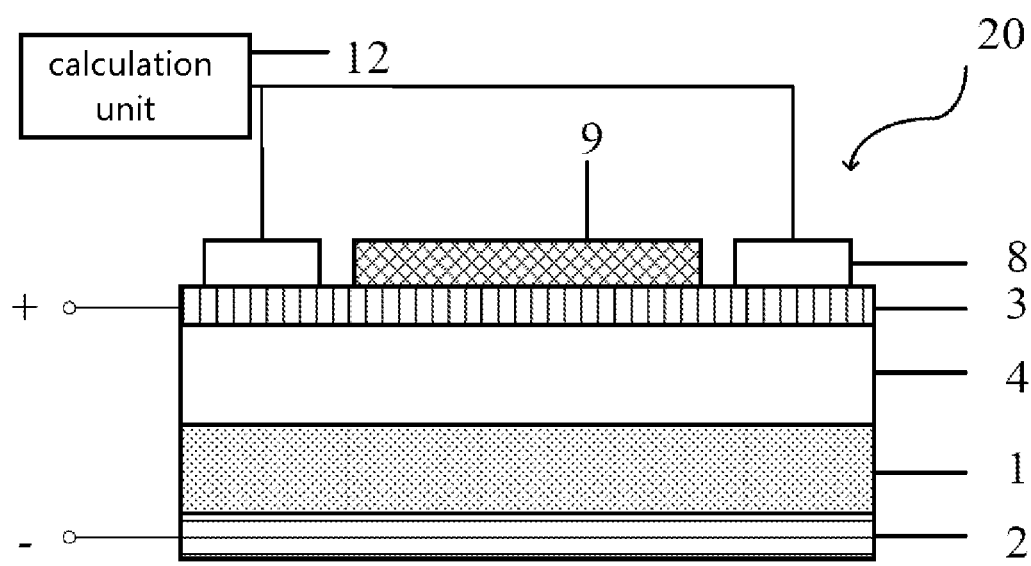
FIG. 13 is a structural schematic diagram of the force measuring device in FIG. 10 including an electroluminescent layer.

FIG. 13 is a structural schematic diagram of the force measuring device in FIG. 10 including an electroluminescent layer. In an embodiment of this disclosure, the optical resonance device can also use an electroluminescent layer. The light emitting layer 1 includes an electroluminescent layer configured to generate light under excitation of an exciting electric field. The reflecting layer 2 and the transflective layer 3 can be multiplexed as electrodes, so as to generate the exciting electric field. In addition, a separate electrode layer (not shown in the figure) can also be arranged so as to generate the exciting electric field. The force measuring device 20 further includes an excitation power supply configured to provide excitation electric energy for the electroluminescent layer.

Figure 14:
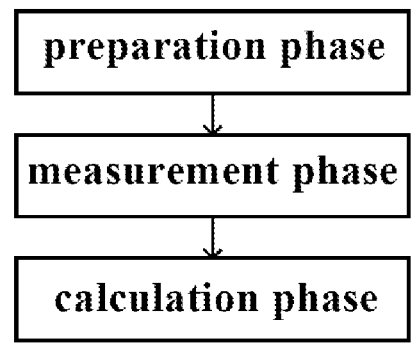
FIG. 14 is a flow chart of a force measuring method according to a third embodiment of this disclosure.

FIG. 14 is a flow chart of a force measuring method according to a third embodiment of this disclosure. In an embodiment of this disclosure, the force measuring method uses the above measuring device. The method includes: a preparation phase, detecting light emitted from the optical resonance device by at least one optical sensor, obtaining a first peak position based on the detected light, and obtaining a first length of a resonant cavity of the optical resonance device corresponding to the first peak position; a measurement phase, receiving an action of force by the bearing unit; detecting light emitted from the optical resonance device by the at least one optical sensor, obtaining a second peak position based on the detected light, and obtaining a second length of the resonant cavity of the optical resonance device corresponding to the second peak position; a calculation phase, calculating the force based on a difference value between the first length and the second length. The formula $F'=\bar{k}\Delta$ can be used to calculate the force, wherein F' is the force, $\bar{k}$ is the coefficient between the length change amount of the resonant cavity of the optical resonance device and the force, which is a constant value, and $\Delta$ is the difference value between the first length and the second length, i.e., the length change amount of the resonant cavity of the optical resonance device (i.e., the deformation amount of the elastic transparent dielectric layer 4 when including the elastic transparent dielectric layer 4).

Specifically, in the preparation phase, if the light emitting layer 1 includes a photoluminescence layer and the bearing unit 9 does not receive the force, the short wavelength light (e.g., blue light) emitted from the excitation light source 11 is transmitted via the photon crystal layer of the reflecting layer 2 to enter the photoluminescence layer, so as to cause photoluminescence of the photoluminescence layer and generate emission of long wavelength light. The long wavelength light (e.g., green light or red light) forms reciprocating reflection between the transflective layer 3 and the reflecting layer 2, which causes micro cavity effect. The optical sensor 8 detects the characteristic of part of the light transmitted by the transflective layer 3. The calculation unit 12 obtains a reference signal. The reference signal corresponds to a reference length of the resonant cavity of the optical resonance device.

In an embodiment of this disclosure, the long wavelength light can also be emitted from the electroluminescent layer directly, and then forms reciprocating reflection between the transflective layer 3 and the reflecting layer 2 so as to cause micro cavity effect.

In the measurement phase, after the bearing unit 9 receives the force, due to mechanical linkage, the optical resonance device 10 (the elastic transparent dielectric layer 4) will generate elastic deformation in the force direction, thereby the distance between the transflective layer 3 and the reflecting layer 2 is changed, such that the characteristic of the light detected by the optical sensor 8 is changed. The calculation unit 12 obtains a measurement signal. The measurement signal corresponds to a measured length of the resonant cavity of the optical resonance device.

In the calculation phase, the calculation unit 12 compares the difference between the measured length and the reference length and calculates the deformation amount of the optical resonance device 10, and then calculates the characteristic (e.g., size, direction) of the force received by the bearing unit 9.

If the optical resonance device 10 includes an elastic transparent dielectric layer 4, the deformation amount of the optical resonance device 10 is namely the deformation amount of the elastic transparent dielectric layer 4. When the calculation unit 12 calculates the deformation amount of the elastic transparent dielectric layer 4, the calculation unit 12 calculates the characteristic (e.g., size, direction) of the force received by the bearing unit 9 based on the modulus of the material of the elastic transparent dielectric layer 4.

When including a plurality of optical sensors 8, the force to be measured F' can be represented as:

$$F' = \frac{\bar{k}}{x}\sum_{i=1}^{x}\Delta_i,$$

wherein x is the number of the optical sensors 8, $\Delta_i$ is the deformation amount of the elastic transparent dielectric layer 4 obtained by the calculation unit 12 based on the data of the ith optical sensor 8 therein, and $\bar{k}$ is the modulus of the elastic transparent dielectric layer 4, which is the known data stored in the calculation unit.

According to an embodiment of this disclosure, in the force measuring device and method, the sensitivity of coupling output of the optical resonance device to the variation of the cavity length of the optical resonance device is used to detect minimum displacement variation caused by a tiny force. Moreover, the detection data of a plurality of optical sensors can be combined to further improve the measurement accuracy of the force. The force measuring device can be adapted to various measurement environments and has strong anti-interference ability.

Figure 15:
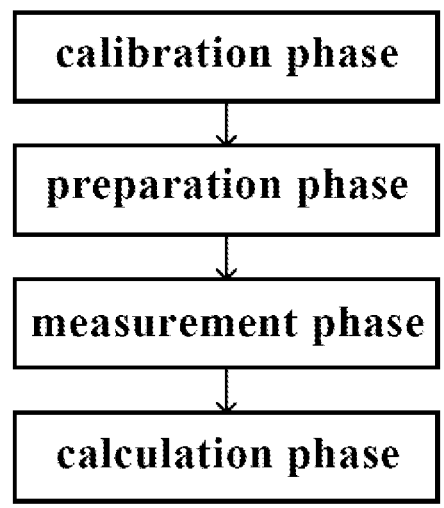
FIG. 15 is another flow chart of the force measuring method according to the third embodiment of this disclosure.

FIG. 15 is another flow chart of the force measuring method according to the third embodiment of this disclosure. In an embodiment of this disclosure, the force measuring method further includes a calibration phase. The calibration phase includes: detecting light emitted from the optical resonance device by the at least one optical sensor, obtaining a third peak position based on the detected light, and obtaining a third length of the resonant cavity of the optical resonance device corresponding to the third peak position; receiving an action of a predetermined constant force by the bearing unit; detecting light emitted from the optical resonance device by the at least one optical sensor, obtaining a fourth peak position based on the detected light, and obtaining a fourth length of the resonant cavity of the optical resonance device corresponding to the fourth peak position; and calculating a coefficient between a length change amount of the resonant cavity of the optical resonance device and a force based on a difference value between the third length and the fourth length, as well as the predetermined constant force.

The formula $\bar{k}=\Delta/F$ can be used to calculate the coefficient, wherein $\bar{k}$ is the coefficient between the length change amount of the resonant cavity of the optical resonance device and the force, F is the predetermined constant force, and $\Delta$ is the difference value between the third length of the resonant cavity of the optical resonance device and the fourth length of the resonant cavity of the optical resonance device.

In the calibration phase, the excitation light source provides the exciting light, the photoluminescence layer generates emitted light, and the optical sensor detects the characteristic of the transmitted light (or, the excitation power supply provides electric energy, the electroluminescent layer generates emitted light, and the optical sensor detects the characteristic of the transmitted light). A predetermined constant force is applied to the bearing unit, the optical sensor detects the characteristic of the transmitted light. The length of the resonant cavity of the optical resonance device is obtained based on the characteristic of the transmitted light. The modulus of the elastic transparent dielectric layer is calculated based on the constant force and the length change amount of the resonant cavity of the optical resonance device caused by the constant force.

When a plurality of optical sensors 8 are used, in an embodiment of this disclosure, the modulus of the elastic transparent dielectric layer 4 is $$\bar{k} = \frac{1}{x}\sum_{i=1}^{x}\frac{F}{\Delta_i},$$

wherein F is the predetermined constant force, x is the number of the optical sensors 8, and $\Delta_i$ is the deformation amount of the elastic transparent dielectric layer 4 obtained by the calculation unit 12 based on the data of the ith optical sensor 8 therein.

According to an embodiment of this disclosure, before performing the measurement, the modulus of the elastic transparent dielectric layer 4 is calibrated, so as to avoid error. The calibration phase can be performed periodically.

A fourth embodiment of this disclosure provides a modulus measuring method for measuring the modulus of the transparent dielectric. The above force measuring device is used in measurement. The force measuring device includes a transparent dielectric layer formed by the transparent dielectric, which is arranged between the light emitting layer and the transflective layer. The modulus measuring method includes: detecting light emitted from the optical resonance device by the at least one optical sensor, obtaining a fifth peak position based on the detected light, and obtaining a fifth length of the resonant cavity of the optical resonance device corresponding to the fifth peak position; receiving an action of a predetermined constant force by the bearing unit; detecting light emitted from the optical resonance device by the at least one optical sensor, obtaining a sixth peak position based on the detected light, and obtaining a sixth length of the resonant cavity of the optical resonance device corresponding to the sixth peak position; and calculating a modulus of the transparent dielectric layer based on a difference value between the fifth length and the sixth length, as well as the predetermined constant force. The formula $\bar{k}=\Delta/F$ can be used to calculate the modulus, wherein $\bar{k}$ is the modulus, F is the predetermined constant force, and $\Delta$ is the difference value between the fifth length and the sixth length.

That is, when measuring the modulus, the excitation light source provides exciting light, the photoluminescence layer generates emitted light, and the optical sensor detects the characteristic of the transmitted light (or, the excitation power supply provides electric energy, the electroluminescent layer generates emitted light, and the optical sensor detects the characteristic of the transmitted light). A predetermined constant force is applied to the bearing unit, the optical sensor detects the characteristic of the transmitted light. The length of the resonant cavity of the optical resonance device is obtained based on the characteristic of the transmitted light. The modulus of the deformed material (e.g., the elastic transparent dielectric layer) in the optical resonance device is calculated based on the constant force and the length change amount of the optical resonance device caused by the constant force.

According to an embodiment of this disclosure, the above force measuring device is used, which can measure the modulus of the material accurately.

A fifth embodiment of this disclosure provides a display panel including the above force measuring device. The display panel can be applied in a display device. The display device can be any product or component with the display function such as: a liquid crystal panel, electronic paper, an OLED panel, a mobile phone, a panel calculator, a television, a display, a laptop, a digital photo frame, a navigator. In the display panel, the above force measuring device is integrated to measure various forces such as touch force or impact force, so as to protect the display panel or provide more operation experience.

According to an embodiment of this disclosure, in the optical resonance device, the light emitting layer in the cavity is used for generating resonance light, which can reduce stray light and improve efficiency. When including a photoluminescence layer, the photon crystal layer is used as a reflecting surface, which increases the reflectivity of the resonance light in the optical resonance device and can transmit the exciting light for the photoluminescence layer. In the force measuring device and method, the sensitivity of coupling output of the optical resonance device to the variation of the cavity length of the optical resonance device is used to detect minimum displacement variation caused by a tiny force. Moreover, the detection data of a plurality of optical sensors can be combined to further improve the measurement accuracy of the force. The force measuring device can be adapted to various measurement environments and has strong anti-interference ability. In the modulus measuring method, the above force measuring device is used to measure the modulus of the material accurately. In the display panel, the above force measuring device is integrated to measure various forces such as touch force or impact force, so as to protect the display panel or provide more operation experience.

It can be understood that the above embodiments are only exemplary embodiments used for explaining the principle of the present disclosure. However, the present disclosure is not limited to this. For the ordinary skilled person in the art, various modifications and improvements can be made in the case of not departing from the spirit and the essence of the present disclosure. These modifications and improvements are also regarded as the protection scope of the present disclosure.

What is claimed is:

1. An optical resonance device, comprising:
   a light emitting layer configured to generate light;
   a reflecting layer arranged at one side of the light emitting layer and configured to reflect the light generated by the light emitting layer;
   a transflective layer arranged at the other side of the light emitting layer, and configured to transmit a portion of the light generated by the light emitting layer and reflect a portion of the light generated by the light emitting layer; and
   a transparent dielectric layer arranged between the light emitting layer and the transflective layer; wherein the transparent dielectric layer is made from optical adhesive;
   wherein the transparent dielectric layer is configured to generate deformation in response to an action of force to the optical resonance device.

2. A force measuring device, comprising:
   an optical resonance device configured to emit light; the optical resonance device comprising: a light emitting layer configured to generate light; a reflecting layer arranged at one side of the light emitting layer and configured to reflect the light generated by the light emitting layer; a transflective layer arranged at the other side of the light emitting layer, and configured to transmit a portion of the light generated by the light emitting layer and reflect a portion of the light generated by the light emitting layer; and a transparent dielectric layer arranged between the light emitting layer and the transflective layer; the transparent dielectric layer being made from optical adhesive;
   at least one optical sensor configured to detect the light emitted from the optical resonance device;
   a bearing unit connected with the optical resonance device and configured to receive an action of force and transfer the force to the optical resonance device; and
   a calculation unit connected with the optical sensor and configured to calculate the force based on the light detected by the optical sensor.

3. The force measuring device according to claim 2, wherein the at least one optical sensor is arranged in the transflective layer and is configured to detect light transmitted from the transflective layer.

4. The force measuring device according to claim 2, wherein the optical resonance device further comprises a transparent dielectric layer arranged between the light emitting layer and the transflective layer.

5. The force measuring device according to claim 4, wherein the transparent dielectric layer is configured to generate deformation in response to an action of force to the optical resonance device.

6. The force measuring device according to claim 2, wherein the light emitting layer comprises a photoluminescence layer configured to generate light under excitation of exciting light; the reflecting layer comprises a photon crystal layer configured to reflect the light generated by the photoluminescence layer and transmit the exciting light;
   the force measuring device further comprises: an excitation light source configured to provide the exciting light.

7. The force measuring device according to claim 2, wherein the light emitting layer comprises an electroluminescent layer configured to generate light under excitation of an exciting electric field;
   the force measuring device further comprises: an excitation power supply configured to provide electric energy so as to generate the exciting electric field.

8. A force measuring method using the force measuring device according to claim 2, comprising:
   detecting light emitted from the optical resonance device by the at least one optical sensor, obtaining a first peak position based on the detected light, and obtaining a first length of a resonant cavity of the optical resonance device corresponding to the first peak position;
   receiving an action of force by the bearing unit; detecting light emitted from the optical resonance device by the at least one optical sensor, obtaining a second peak position based on the detected light, and obtaining a second length of the resonant cavity of the optical resonance device corresponding to the second peak position; and
   calculating the force based on a difference value between the first length and the second length, and a coefficient between a length change amount of the resonant cavity of the optical resonance device and a force.

9. The force measuring method according to claim 8, wherein the force measuring device further comprises: a transparent dielectric layer arranged between the light emitting layer and the transflective layer; wherein the transparent dielectric layer is configured to generate deformation in response to an action of force to the optical resonance device.

10. The force measuring method according to claim 8, wherein a formula $F'=\overline{k}\Delta$ is used for calculating the force, wherein F' is the force, $\overline{k}$ is the coefficient between the length change amount of the resonant cavity of the optical resonance device and the force, which is a constant value, and $\Delta$ is the difference value between the first length and the second length.

11. The force measuring method according to claim 10, further comprising: a calibration phase, the calibration phase comprising:
    detecting light emitted from the optical resonance device by the at least one optical sensor, obtaining a third peak position based on the detected light, and obtaining a third length of the resonant cavity of the optical resonance device corresponding to the third peak position;
    receiving an action of a predetermined constant force by the bearing unit; detecting light emitted from the optical resonance device by the at least one optical sensor, obtaining a fourth peak position based on the detected light, and obtaining a fourth length of the resonant cavity of the optical resonance device corresponding to the fourth peak position; and
    calculating a coefficient between a length change amount of the resonant cavity of the optical resonance device and a force based on a difference value between the third length and the fourth length, as well as the predetermined constant force.

12. The force measuring method according to claim 11, wherein a formula $\overline{k}=\Delta/F$ is used for calculating the coefficient, wherein $\overline{k}$ is the coefficient between the length change amount of the resonant cavity of the optical resonance device and the force, F is the predetermined constant force, and $\Delta$ is the difference value between the third length and the fourth length.

13. A modulus measuring method, using the force measuring device according to claim 2 to measure a modulus of a transparent dielectric; wherein the force measuring device further comprises: a transparent dielectric layer formed by the transparent dielectric arranged between the light emitting layer and the transflective layer;
    wherein the method comprises:
    detecting light emitted from the optical resonance device by the at least one optical sensor, obtaining a fifth peak position based on the detected light, and obtaining a fifth length of the resonant cavity of the optical resonance device corresponding to the fifth peak position;
    receiving an action of a predetermined constant force by the bearing unit; detecting light emitted from the optical resonance device by the at least one optical sensor, obtaining a sixth peak position based on the detected light, and obtaining a sixth length of the resonant cavity of the optical resonance device corresponding to the sixth peak position; and
    calculating a modulus of the transparent dielectric layer based on a difference value between the fifth length and the sixth length, as well as the predetermined constant force.

14. The modulus measuring method according to claim 13, wherein the transparent dielectric layer is configured to generate deformation in response to an action of force to the optical resonance device.

15. The modulus measuring method according to claim 13, wherein a formula $\overline{k}=\Delta/F$ is used for calculating the modulus, wherein $\overline{k}$ is the modulus, F is the predetermined constant force, and $\Delta$ is the difference value between the fifth length and the sixth length.

16. A display panel, comprising the force measuring device according claim 2.

* * * * *